(12) United States Patent
Kato et al.

(10) Patent No.: US 9,021,879 B2
(45) Date of Patent: May 5, 2015

(54) OSCILLATION TYPE INERTIA FORCE SENSOR

(75) Inventors: Yoshitaka Kato, Nagaokakyo (JP); Akira Mori, Nagaokakyo (JP); Makoto Narita, Chiyoda-ku (JP)

(73) Assignees: Murata Manufacturing Co., Ltd., Kyoto (JP); Asahi Kasei Microdevices Corporation, Tokyo (JP)

( * ) Notice: Subject to any disclaimer, the term of this patent is extended or adjusted under 35 U.S.C. 154(b) by 262 days.

(21) Appl. No.: 13/569,207

(22) Filed: Aug. 8, 2012

(65) Prior Publication Data

US 2013/0192366 A1   Aug. 1, 2013

Related U.S. Application Data

(63) Continuation of application No. PCT/JP2010/073718, filed on Dec. 28, 2010.

(30) Foreign Application Priority Data

Feb. 17, 2010   (JP) ................................. 2010-032398

(51) Int. Cl.
*G01C 19/56*   (2012.01)
*G01C 19/5776*   (2012.01)

(52) U.S. Cl.
CPC ............ *G01C 19/56* (2013.01); *G01C 19/5776* (2013.01)

(58) Field of Classification Search
CPC ............... G01C 19/5719; G01C 19/56; G01C 19/5607; G01C 19/5649; G01C 19/5642; G01C 19/5663; G01C 19/5635; G01C 19/5621; G01C 19/5628
USPC ............... 73/504.12, 504.14, 504.16, 504.02, 73/504.04
See application file for complete search history.

(56) References Cited

U.S. PATENT DOCUMENTS 4,671,112 A * 6/1987 Kimura et al. ............. 73/504.16
5,426,970 A * 6/1995 Florida et al. .................. 73/1.37

(Continued)

FOREIGN PATENT DOCUMENTS

DE   10 2006 024 474 A1   12/2006
DE   699 37 853 T2   5/2008

(Continued)

OTHER PUBLICATIONS

Official Communication issued in International Patent Application No. PCT/JP2010/073718, mailed on Mar. 15, 2011.

(Continued)

*Primary Examiner* — Helen Kwok
(74) *Attorney, Agent, or Firm* — Keating & Bennett, LLP

(57) ABSTRACT

An inertia force sensor that shortens a time from power activation until inertia force can be detected includes an oscillator, an oscillation circuit unit, and a detection circuit unit. The oscillation circuit unit functions as a closed loop self oscillation circuit with the oscillator as a resonant element, and includes a CV conversion circuit converting a monitor signal based on electrostatic capacitance according to an oscillating state of oscillator into a monitor signal based on a voltage corresponding to an amount in change of the electrostatic capacitance, and an automatic gain control circuit controlling gain based on the monitor signal converted at the CV conversion circuit to generate a driving signal, and supplying the driving signal to the oscillator. The CV conversion circuit includes an amplifier that amplifies a monitor signal with an amplification factor for a predetermined period after power activation.

5 Claims, 5 Drawing Sheets

(56) References Cited

U.S. PATENT DOCUMENTS

| | | | |
|---|---|---|---|
| 5,794,080 A | | 8/1998 | Watanabe et al. |
| 6,089,091 A * | | 7/2000 | Nozoe et al. ............... 73/504.16 |
| 6,220,094 B1 | | 4/2001 | Ichinose et al. |
| 6,621,279 B2 * | | 9/2003 | Ward ............................ 324/684 |
| 6,705,151 B2 * | | 3/2004 | Nozoe et al. .................... 73/1.37 |
| 6,722,198 B1 * | | 4/2004 | Konaka ............................ 73/511 |
| 7,107,841 B2 * | | 9/2006 | Mori ............................ 73/504.12 |
| 7,216,538 B2 * | | 5/2007 | Ito et al. ...................... 73/504.12 |
| 7,401,515 B2 * | | 7/2008 | Weber ......................... 73/504.12 |
| 7,895,893 B2 * | | 3/2011 | Mayer-Wegelin et al. 73/504.12 |
| 8,096,180 B2 * | | 1/2012 | Yamanaka et al. ......... 73/504.12 |
| 8,127,608 B2 * | | 3/2012 | Murashima ................. 73/504.12 |
| 8,578,775 B2 * | | 11/2013 | Hayner et al. .............. 73/504.12 |
| 2006/0277995 A1 | | 12/2006 | Kutsuna |
| 2007/0144256 A1 * | | 6/2007 | Mori et al. ................. 73/504.12 |
| 2007/0261488 A1 * | | 11/2007 | Murashima ................. 73/504.04 |
| 2008/0105054 A1 | | 5/2008 | Kanai et al. |
| 2008/0178672 A1 | | 7/2008 | Kanai et al. |
| 2009/0007663 A1 * | | 1/2009 | Uemura ..................... 73/504.15 |
| 2009/0064781 A1 * | | 3/2009 | Ayazi et al. ................ 73/504.12 |
| 2009/0071247 A1 * | | 3/2009 | Konaka ....................... 73/504.14 |
| 2009/0084180 A1 * | | 4/2009 | Yoshida et al. ............ 73/504.02 |
| 2009/0217757 A1 | | 9/2009 | Nozawa |
| 2010/0126271 A1 * | | 5/2010 | Inukai et al. ............... 73/504.12 |

FOREIGN PATENT DOCUMENTS

| | | |
|---|---|---|
| JP | 09-033262 A | 2/1997 |
| JP | 11-281368 A | 10/1999 |
| JP | 2007-221575 A | 8/2007 |
| JP | 2009-094573 A | 4/2009 |
| JP | 2009-260503 A | 11/2009 |

OTHER PUBLICATIONS

Kato et al., "Oscillation Type Inertia Force Sensor,", U.S. Appl. No. 13/569,209, filed Aug. 8, 2012.

Official Communication issued in corresponding German Patent Application No. 11 2010 005 045.7, mailed on Jul. 10, 2014.

* cited by examiner

OSCILLATION TYPE INERTIA FORCE SENSOR

BACKGROUND OF THE INVENTION

1. Field of the Invention

The present invention relates to an inertia force sensor that detects an inertia force, particularly an oscillation type inertia force sensor that detects the inertia force using an oscillator.

2. Description of the Related Art

An oscillation type inertia force sensor is used as, for example, an angular velocity sensor detecting the angular velocity based on inertia force. An oscillation type inertia force sensor includes an oscillator for detecting angular velocity, an oscillation circuit unit supplying a driving signal to the oscillator, and a detection circuit unit detecting the angular velocity of the oscillator. An oscillator includes an electrostatic driving and capacitance detection type, a piezoelectric driving and detection type, or the like. An oscillator includes an oscillating body that oscillates by the angular velocity, driving means for driving the oscillating body, monitor means for feeding back to an oscillation circuit unit a monitor signal according to the level of amplitude of the oscillating body (oscillating state of the oscillator), and detection means for providing a detection signal based on the oscillatory displacement caused by a Coriolis force of the oscillating body.

The oscillation circuit unit is formed as a self oscillation circuit of a closed loop with the oscillator as the resonant element to generate a driving signal from a monitor signal according to the level of amplitude of the oscillating body and supplies the driving signal to the oscillator to control the drive of the oscillating body. The detection circuit unit generates and outputs an angular velocity detection signal based on the detection signal applied from the detection means of the oscillator. The angular velocity detection signal corresponds to a DC voltage in accordance with the degree of the angular velocity of the oscillator.

An oscillation type inertia force sensor cannot detect the angular velocity until the amplitude of the oscillating body attains a predetermined level after the power is turned on. It is desirable to shorten the startup time starting from power activation and up to the amplitude of the oscillating body attaining a predetermined level at the oscillation type inertia force sensor. For example, Japanese Patent Laying-Open No. 11-281368 discloses an oscillation type inertia force sensor that can shorten the startup time. The oscillation type inertia force sensor disclosed in Japanese Patent Laying-Open No. 11-281368 includes a voltage amplifier inside or at a succeeding stage of a variable gain amplification circuit (VGA circuit) constituting an automatic gain control circuit (AGC circuit). Further, the voltage amplifier includes switching means for switching the amplification factor (gain) according to the voltage level of a monitor signal.

In a conventional oscillation type inertia force sensor, the monitor signal is amplified by a VGA circuit until the amplitude of the oscillating body attains a predetermined level after the power is turned on, attaining a state allowing detection of the angular velocity of the oscillator. Therefore, the startup time of the oscillation type inertia force sensor can be shortened by increasing the amplification factor of the VGA circuit.

For the purpose of reducing the startup time at the oscillation type inertia force sensor, increasing the amplification factor of the VGA circuit (to have a wide gain variable range) is required, leading to the necessity of a complicated circuit design. Even if the amplification factor of the VGA circuit could be increased by a complicated circuit design, it was difficult to amplify the monitor signal by the VGA circuit over the entire gain variable range to stabilize the operation of the automatic gain control circuit. Thus, a conventional oscillation type inertia force sensor had the problem that the startup time can be reduced only in a gain variable range inherent to the VGA circuit according to the amplification factor of the VGA circuit.

SUMMARY OF THE INVENTION

In view of the foregoing, preferred embodiments of the present invention provide an oscillation type inertia force sensor that can have the period of time starting from power activation and until an inertia force (angular velocity) can be detected, i.e. the startup time, shortened, without making the operation of an automatic gain control circuit unstable.

An oscillation type inertia force sensor according to a first aspect of a preferred embodiment of the present invention includes an oscillator that detects an inertia force, an oscillation circuit unit that supplies a driving signal to the oscillator, and a detection circuit that detects the inertia force of the oscillator. The oscillation circuit unit functions as a self oscillation circuit of a closed loop with the oscillator as a resilient element, and includes a signal conversion circuit that converts a monitor signal based on electrostatic capacitance according to an oscillating state of the oscillator into a monitor signal based on a voltage corresponding to an amount of change of the electrostatic capacitance, and an automatic gain control circuit that controls a gain based on the monitor signal converted at the signal conversion circuit to generate the driving signal, and that supplies the driving signal to the oscillator. The signal conversion circuit includes an amplifier that amplifies the monitor signal with a predetermined amplification factor for a predetermined period after power activation.

In the oscillation type inertia force sensor including an oscillator, an oscillation circuit unit, and a detection circuit unit according to the first aspect of a preferred embodiment of the present invention, the oscillation circuit unit functions as a self oscillation circuit of a closed loop with the oscillator as a resonant element, and includes a signal conversion circuit that converts a monitor signal based on electrostatic capacitance according to an oscillating state of the oscillator into a monitor signal based on a voltage corresponding to an amount of change of the electrostatic capacitance, and an automatic gain control circuit controlling gain based on the monitor signal converted at the signal conversion circuit to generate a driving signal, and supplying the driving signal to the oscillator. Since the signal conversion circuit includes an amplifier that amplifies the monitor signal with a predetermined amplification factor for a predetermined period after power activation, a greatly amplified monitor signal can be supplied to the oscillator as the driving signal to greatly alter the oscillating state of the oscillator such that the period of time starting from power activation and until inertia force can be detected, i.e. the startup time, can be shortened. Further, since the startup time of the oscillation type inertia force sensor is significantly shortened with the use of the amplifier of the signal conversion circuit, the automatic gain control circuit can be used in the gain variable range of the variable gain amplification circuit (the gain variable range inherent to the VGA circuit). Thus, an automatic gain control circuit having stable operation and favorable accuracy can be realized.

An oscillation type inertia force sensor according to a second aspect of a preferred embodiment of the present invention is characterized in that, based on the first aspect, the signal conversion circuit preferably includes an operational amplifier circuit including a feedback capacitor. The amplifier amplifies the monitor signal by switching the level of the feedback capacitance for the predetermined period after power activation.

Since the signal conversion circuit includes an operational amplifier circuit including a feedback capacitor, and the amplifier amplifies a monitor signal by switching the level of the feedback capacitor for a predetermined period after power activation according to the second aspect, a greatly amplified monitor signal can be supplied to the oscillator as a driving signal to greatly alter the oscillating state of the oscillator, allowing the period of time starting from power activation and until inertia force can be detected, i.e. the startup time, to be shortened.

An oscillation type inertia force sensor according to a third aspect of a preferred embodiment of the present invention is characterized in that, based on the first or second aspect, when the amplification factor of the amplification circuit in the automatic gain control circuit has a negative property to the control signal that controls the gain of the automatic gain control circuit, the predetermined period is a period during which the gain based on the control signal becomes less than or equal to the maximum gain of the amplification factor of the amplification circuit in the range where the gain varies corresponding to a change of the control signal after power activation.

When the amplification factor of the amplification circuit of the automatic gain control circuit has a negative property to the control signal controlling the gain of the automatic gain control circuit in the third aspect of a preferred embodiment of the present invention, the period during which the gain based on the control signal becomes less than or equal to the maximum gain of the amplification factor of the amplification circuit is set as the predetermined period in the range where the gain changes with respect to a change of the control signal after power is turned on. This prevents reduction in the gain of the automatic gain control circuit, and the period of time starting from power activation and until inertia force can be detected, i.e. the startup time, can be shortened.

An oscillation type inertia force sensor according to a fourth aspect of a preferred embodiment of the present invention is characterized in that, based on the first or second aspect, when the amplification factor of the amplification circuit in the automatic gain control circuit has a positive property to the control signal that controls the gain of the automatic gain control circuit, the predetermined period is a period during which the gain based on the control signal becomes greater than or equal to the maximum gain of the amplification factor of the amplification circuit in the range where the gain changes with respect to a change of the control signal after power is turned on.

When the amplification factor of the amplification circuit of the automatic gain control circuit has a positive property to the control signal controlling the gain of the automatic gain control circuit in the fourth aspect of a preferred embodiment of the present invention, the period during which the gain based on the control signal becomes greater than or equal to the maximum gain of the amplification factor of the amplification circuit is set as the predetermined period in the range where the gain varies corresponding to a change of the control signal after power activation. This prevents reduction in the gain of the automatic gain control circuit, and the period of time starting from power activation and until inertia force can be detected, i.e. the startup time, can be shortened.

An oscillation type inertia force sensor according to a fifth aspect of a preferred embodiment of the present invention is characterized in that, based on any one of the second to fourth aspects, the amplifier switches the level of feedback capacitor based on a control signal controlling the gain of the automatic gain control circuit.

Since the amplifier switches the level of the feedback capacitor based on a control signal controlling the gain of the automatic gain control circuit in the fifth aspect, the switching timing can be set arbitrarily by the level of the control signal, allowing the period of time starting from power activation and until inertia force can be detected, i.e. the startup time, to be shortened. When the amplification factor of the amplification circuit in the automatic gain control circuit has a negative property to the control signal, reduction in the gain of the automatic gain control circuit can be prevented by setting the switching timing at a period during which the gain based on a control signal becomes less than or equal to the maximum gain of the amplification factor of the amplification circuit. When the amplification factor of the amplification circuit has a positive property to the control signal, reduction in the automatic gain control circuit can be prevented by setting the switching timing to the period during which the gain based on a control signal becomes greater than or equal to the maximum gain of the amplification factor of the amplification circuit.

An oscillation type inertia force sensor according to a sixth aspect of a preferred embodiment of the present invention is characterized in that, based on the fifth aspect, the feedback capacitor includes a first feedback capacitor and a second feedback capacitor. The first feedback capacitor preferably is the capacitor constantly connected to the operational amplifier circuit. The second feedback capacitor preferably is at least one capacitor connected to the operational amplifier circuit based on the control signal.

Since the first feedback capacitor preferably is the capacitor constantly connected to the operational amplifier circuit and the second feedback capacitor preferably is at least one capacitor connected to the operational amplifier circuit based on the control signal according to the sixth aspect, a signal conversion circuit having a fail safe configuration in which a fatal failure can be avoided even if connection with the second feedback capacitor connected based on the control signal is disabled.

An oscillation type inertia force sensor according to a preferred embodiment of the present invention includes an oscillator, an oscillation circuit unit, and a detection circuit unit, wherein the oscillation circuit unit functions as a self oscillation circuit of a closed loop with the oscillator as a resonant element, and includes a signal conversion circuit that converts a monitor signal based on electrostatic capacitance according to an oscillating state of the oscillator into a monitor signal based on a voltage corresponding to an amount of change of the electrostatic capacitance, and an automatic gain control circuit that controls the amplification factor (gain) based on the monitor signal converted at the signal conversion circuit to generate a driving signal and that supplies the driving signal to the oscillator. Since the signal conversion circuit includes an amplifier that amplifies the monitor signal with a predetermined amplification factor for a predetermined period after power activation, a greatly amplified monitor signal can be supplied to the oscillator as a driving signal to greatly alter the oscillating state of the oscillator, allowing the period of time starting from power activation and until inertia force can be detected, i.e. the startup time, to be shortened. Since the startup time of the oscillation type inertia force sensor can be shortened using the amplifier of the signal conversion circuit, the automatic gain control circuit can be used in a gain variable range of the variable gain amplification circuit (the gain variable range inherent to the VGA circuit).

Thus, an automatic gain control circuit having stable operation and favorable accuracy can be realized.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Oscillation type inertia force sensors according to preferred embodiments of the present invention will be described hereinafter in detail with reference to the drawings. The preferred embodiments set forth below are not intended to restrict the present invention defined in the claims, and all the combinations of the features described in the preferred embodiments are not necessarily indispensable to the present invention.

Figure 1:
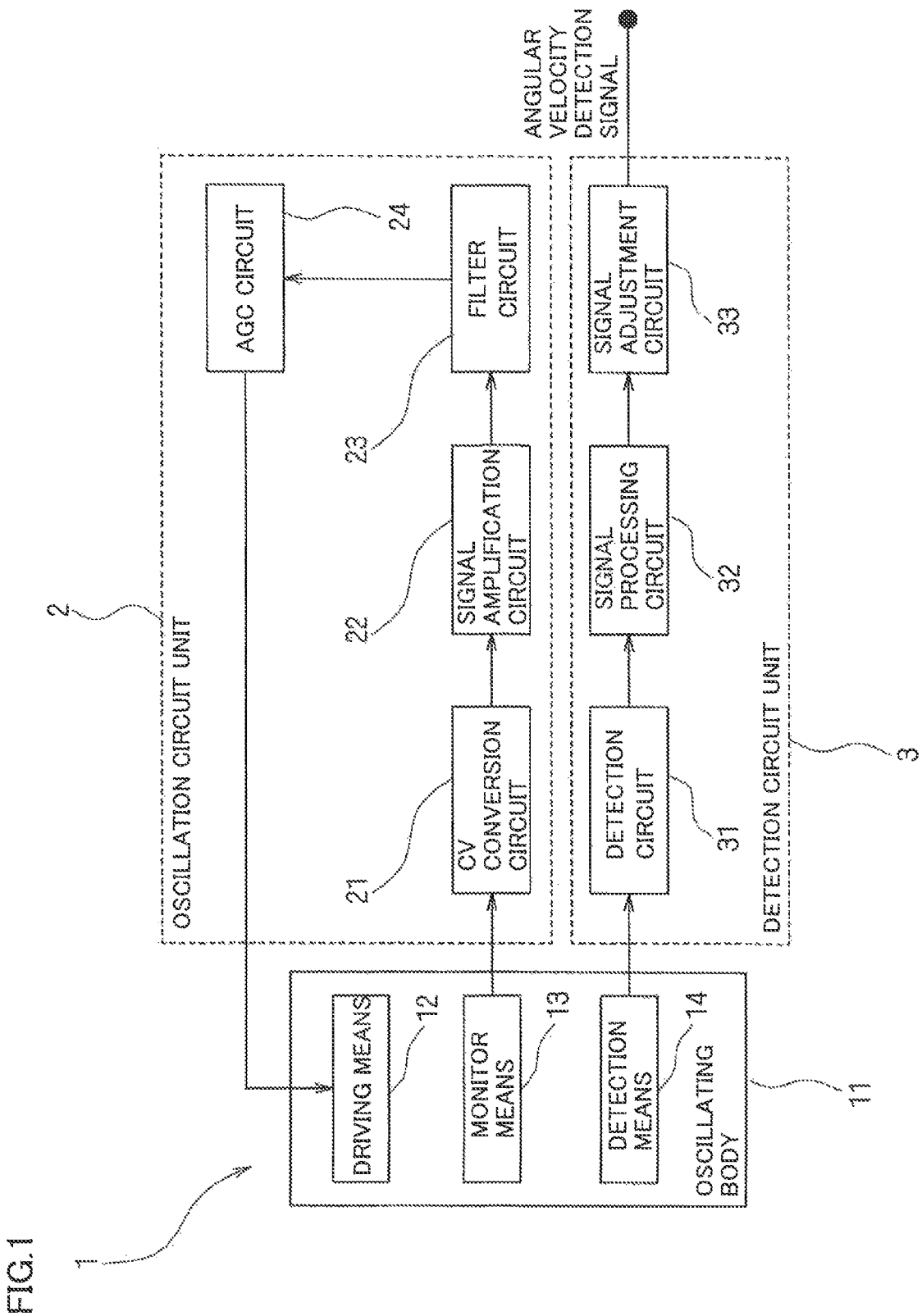
FIG. 1 is a block diagram representing a configuration of an oscillation type inertia force sensor according to a preferred embodiment of the present invention.

FIG. 1 is a block diagram representing a configuration of an oscillation type inertia force sensor according to a preferred embodiment of the present invention. The oscillation type inertia force sensor according to a preferred embodiment of the present invention will be described hereinafter as being used as an angular velocity sensor detecting angular velocity based on inertia force. The oscillation type inertia force sensor of FIG. 1 includes an oscillator 1 that detects the angular velocity (inertia force), an oscillation circuit unit 2 that supplies a driving signal to oscillator 1, and a detection circuit unit 3 that detects the angular velocity of oscillator 1.

Oscillator 1 preferably is of the electrostatic driving and capacitance detection type, and includes oscillating body 11, driving element 12 that drives oscillating body 11, monitor 13 that feeds back a monitor signal according to the level of amplitude of oscillating body 11 (oscillating state of the oscillator 1) to oscillation circuit unit 2, and detector 14 that provides a detection signal based on the degree of angular velocity of oscillator 1 by detecting oscillatory displacement due to the Coriolis force of oscillating body 11. Oscillating body 11 preferably includes an oscillation substrate made of silicon material, glass material, or other suitable material, for example.

Oscillation circuit unit 2 functions as a self oscillation circuit of a closed loop with oscillator 1 as a resonant element, and includes a CV conversion circuit (signal conversion circuit) 21, a signal amplification circuit 22, a filter circuit 23, and an AGC circuit (automatic gain control circuit) 24.

Oscillation circuit unit 2 is connected to driving element 12 and monitor 13 of oscillator 1, and the monitor signal from monitor 13 is fed back to CV conversion circuit 21. The monitor signal fed back from monitor 13 is based on the electrostatic capacitance corresponding to the level of amplitude of oscillating body 11. CV conversion circuit 21 converts a monitor signal based on electrostatic capacitance corresponding to the level of amplitude of oscillating body 11 into a monitor signal based on a voltage corresponding to the amount of change of electrostatic capacitance. Signal amplification circuit 22 amplifies the monitor signal converted at CV conversion circuit 21 with a predetermined amplification factor (gain). Filter circuit 23 removes a predetermined signal from the monitor signal amplified at signal amplification circuit 22. AGC circuit 24 controls the amplification factor (gain) such that the amplitude of the monitor signal is constant based on the monitor signal from filter circuit 23 to supply the monitor signal amplified with the controlled amplification factor to driving element 12 as a driving signal of oscillator 1.

Detection circuit unit 3 includes a detection circuit 31, a signal processing circuit 32, and a signal adjustment circuit 33.

Detection circuit 31 converts the detection signal applied from detector 14 of oscillator 1 into a detection signal based on a voltage corresponding to the oscillatory displacement by Coriolis force of oscillating body 11 for output. Signal processing circuit 32 carries out signal processing such as extracting an angular velocity signal corresponding to the degree of the angular velocity from the detection signal applied from detection circuit 31. Signal adjustment circuit 33 makes adjustment and others of the phase of the detection signal processed at signal processing circuit 32 to output an angular velocity detection signal.

Figure 2:
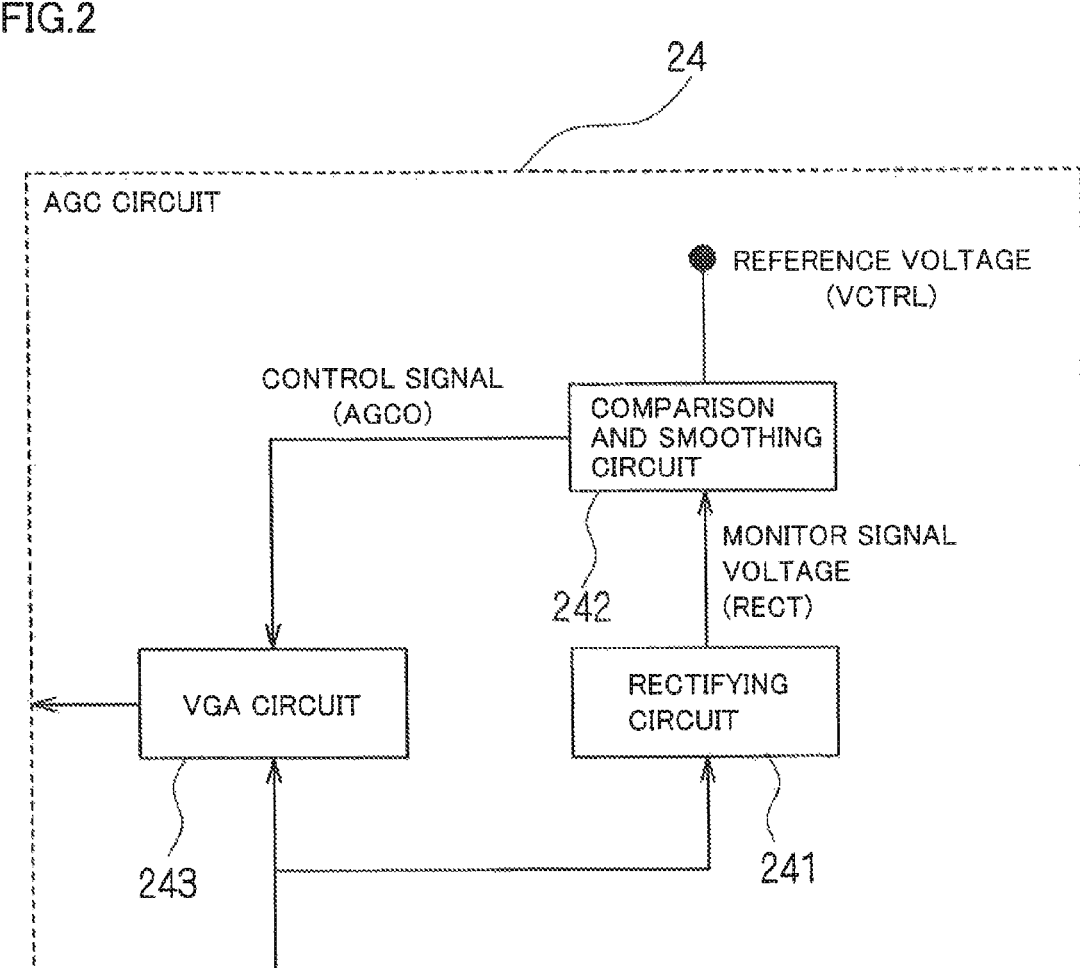
FIG. 2 is a block diagram representing a configuration of an AGC circuit of an oscillation type inertia force sensor according to a preferred embodiment of the present invention.

As set forth above, oscillation circuit unit 2 amplifies the monitor signal at AGC circuit 24 such that the amplitude is constant to supply the amplified monitor signal to driving element 12 as the driving signal for oscillator 1. FIG. 2 is a block diagram representing a configuration of AGC circuit 24 of the oscillation type inertia force sensor according to a preferred embodiment of the present invention. As shown in FIG. 2, AGC circuit 24 includes a rectifying circuit 241, a comparison and smoothing circuit 242, and a VGA circuit (variable gain amplification circuit) 243.

Rectifying circuit 241 rectifies the monitor signal applied from filter circuit 23 to convert into a RECT voltage (the voltage of the monitor signal) that is DC voltage for output. Comparison and smoothing circuit 242 compares the RECT voltage output from rectifying circuit 241 with a predetermined reference voltage (VCTRL voltage) corresponding to the reference amplitude of oscillator 1, and outputs a control signal (AGCO signal) controlling the amplification factor of VGA circuit 243 based on the compared result. Comparison and smoothing circuit 242 smoothes the AGCO signal, as necessary, for output. The RECT voltage corresponds to the amplitude of oscillator 1 at the point in time when monitor 13 of oscillator 1 outputs a monitor signal. Therefore, the control error $\Delta V$ in an oscillation of oscillator 1 can be represented by the following Equation 1.

$$\Delta V = RECT - VCTRL \quad \text{(Equation 1)}$$

In Equation 1, RECT is the voltage of the monitor signal (RECT voltage), and VCTRL is the reference voltage (VCTRL voltage). Since the relationship of VCTRL>RECT is met here, $\Delta V$ takes a negative example.

Control error $\Delta V$ has the relationship shown in Equation 2 to the AGCO signal.

$$AGCO = \Delta V \times Gctrl + VDD/2 \quad \text{(Equation 2)}$$

In Equation 2, AGCO is the control signal (AGCO signal), GCtrl (>0) is the amplification factor based on the control signal, and VDD is the driving voltage of AGC circuit 24.

Based on the AGCO signal output from comparison and smoothing circuit 242, the monitor signal is amplified at VGA circuit 243. The monitor signal amplified at VGA circuit 243 is supplied to driving element 12 as a driving signal. By driving element 12 driving oscillator 1 based on the driving signal, the amplitude of oscillating body 11 is rendered constant.

The oscillation type inertia force sensor amplifies the monitor signal by VGA circuit 243 until the amplitude of oscillating body 11 attains a predetermined level after power activation, attaining a state capable of detecting the angular velocity of oscillator 1. Therefore, the startup time of the oscillation type inertia force sensor can be shortened by increasing the amplification factor of VGA circuit 243. However, the amplification factor of VGA circuit 243 is finite. The oscillation type inertia force sensor according to a preferred embodiment of the present invention includes an amplifier that amplifies a monitor signal provided at CV conversion circuit 21 located at a preceding stage of AGC circuit 24 including VGA circuit 243 to compensate for the amplification factor of VGA circuit 243 to shorten the startup time.

Figure 3:
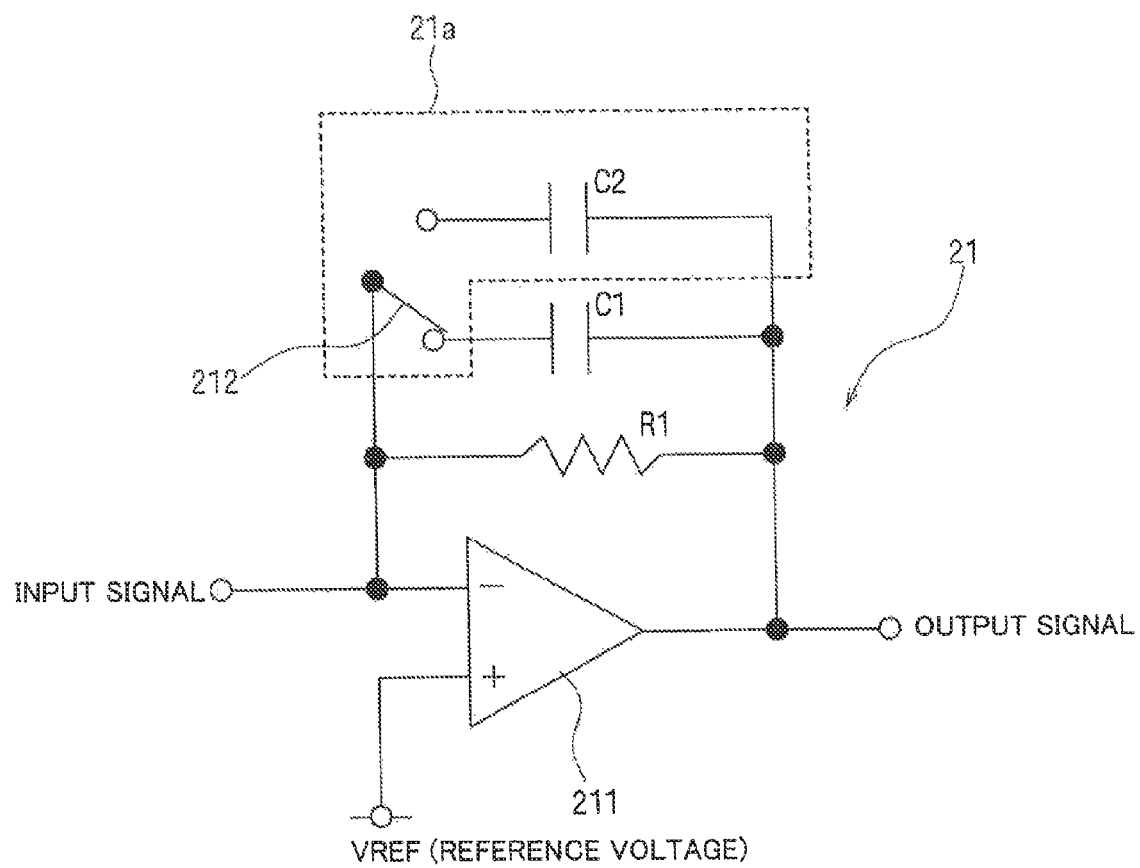
FIG. 3 is a circuit diagram representing a configuration of a CV conversion circuit of an oscillation type inertia force sensor according to a preferred embodiment of the present invention.

FIG. 3 is a circuit diagram representing a configuration of CV conversion circuit 21 of the oscillation type inertia force sensor according to a preferred embodiment of the present invention. As shown in FIG. 3, CV conversion circuit 21 includes a feedback capacitor C1 and an operational amplifier 211 to which is connected a feedback resistor R1 connected parallel with feedback capacitor C1. Operational amplifier 211 has a monitor signal output from monitor 13 (input signal) applied to the negative input terminal and a reference voltage VREF applied to the positive input terminal to provide a converted monitor signal from the output terminal (output signal). CV conversion circuit 21 further includes, as an amplifier 21a that amplifies a monitor signal, a feedback capacitor C2 having a capacitance smaller than that of feedback capacitor C1, and a switch 212 switching between feedback capacitor C1 and feedback capacitor C2, for example.

For example, CV conversion circuit 21 having the capacitance of feedback capacitor C1 set to approximately 2.0 pF and the resistance of feedback resistor R1 set to approximately 280 MΩ has a cut off frequency of approximately 280 Hz, so that the driving frequency (approximately 15 kHz) is sufficiently higher than the cut off frequency. When the driving frequency of CV conversion circuit 21 is sufficiently higher than the cut off frequency, the amplification factor of CV conversion circuit 21 is inversely proportional to the capacitance of the feedback capacitor. Therefore, by switching to feedback capacitor C2 having a capacitance smaller than that of feedback capacitor C1 via switch 212, the amplification factor of CV conversion circuit 21 is increased. For example, when the capacitance of feedback capacitor C2 is preferably set at approximately 0.5 pF that is about ¼ the capacitance of feedback capacitor C1, the amplification factor of CV conversion circuit 21 is increased to approximately 4 times.

By switching to feedback capacitor C2 through switch 212 at the point in time of turning on the power of the oscillation type inertia force sensor according to a preferred embodiment of the present invention, the monitor signal converted at CV conversion circuit 21 is amplified (for example, approximately 4 times) to be output to AGC circuit 24 through signal amplification circuit 22 and filter circuit 23.

When the monitor signal converted at CV conversion circuit 21 is amplified, the RECT voltage (voltage of the monitor signal) output from rectifying circuit 241 is also increased. Since the AGCO signal output from comparison and smoothing circuit 242 can be obtained from Equation 1 and Equation 2, the voltage level is increased according to the RECT voltage output from rectifying circuit 241. By amplifying the monitor signal at CV conversion circuit 21, the voltage level of the AGCO signal is located in the level range where the gain based on the AGCO signal at AGC circuit 24 becomes less than or equal to the maximum gain of the amplification factor of VGA circuit 243. Although the case where the amplification factor of VGA circuit 243 has a negative property to the control signal has been indicated, the case where the amplification factor of VGA circuit 243 has a positive property to the control signal is possible depending upon the circuit design. In this case, the voltage level of the AGCO signal is located in the level range where the gain based on the AGCO signal of AGC circuit 24 is greater than or equal to the maximum gain of the amplification factor of VGA circuit 243.

When an AGCO signal of a voltage level located in a level range where the gain based on the AGCO signal becomes less than or equal to the maximum gain of the amplification factor of VGA circuit 243 is input, VGA circuit 243 amplifies the input monitor signal with substantially the maximum amplification factor of VGA circuit 243 in the gain variable range inherent to the VGA circuit, and supplies the amplified signal to driving element 12 as a driving signal. Since VGA circuit 243 amplifies the monitor signal amplified at CV conversion circuit 21 with substantially the maximum amplification factor of VGA circuit 243 in the gain variable range inherent to the VGA circuit, the driving signal is large as compared to the case where the monitor signal is not amplified at CV conversion circuit 21, allowing the period of time starting from power activation and until the amplitude of oscillating body 11 attains a predetermined level to be reduced. The startup time can be significantly shortened. Furthermore, since CV conversion circuit 21 amplifies the monitor signal with feedback capacitors C1 and C2 switched, the circuit configuration can save space as compared to the case where the monitor signal is amplified with the resistor switched.

Figure 4:
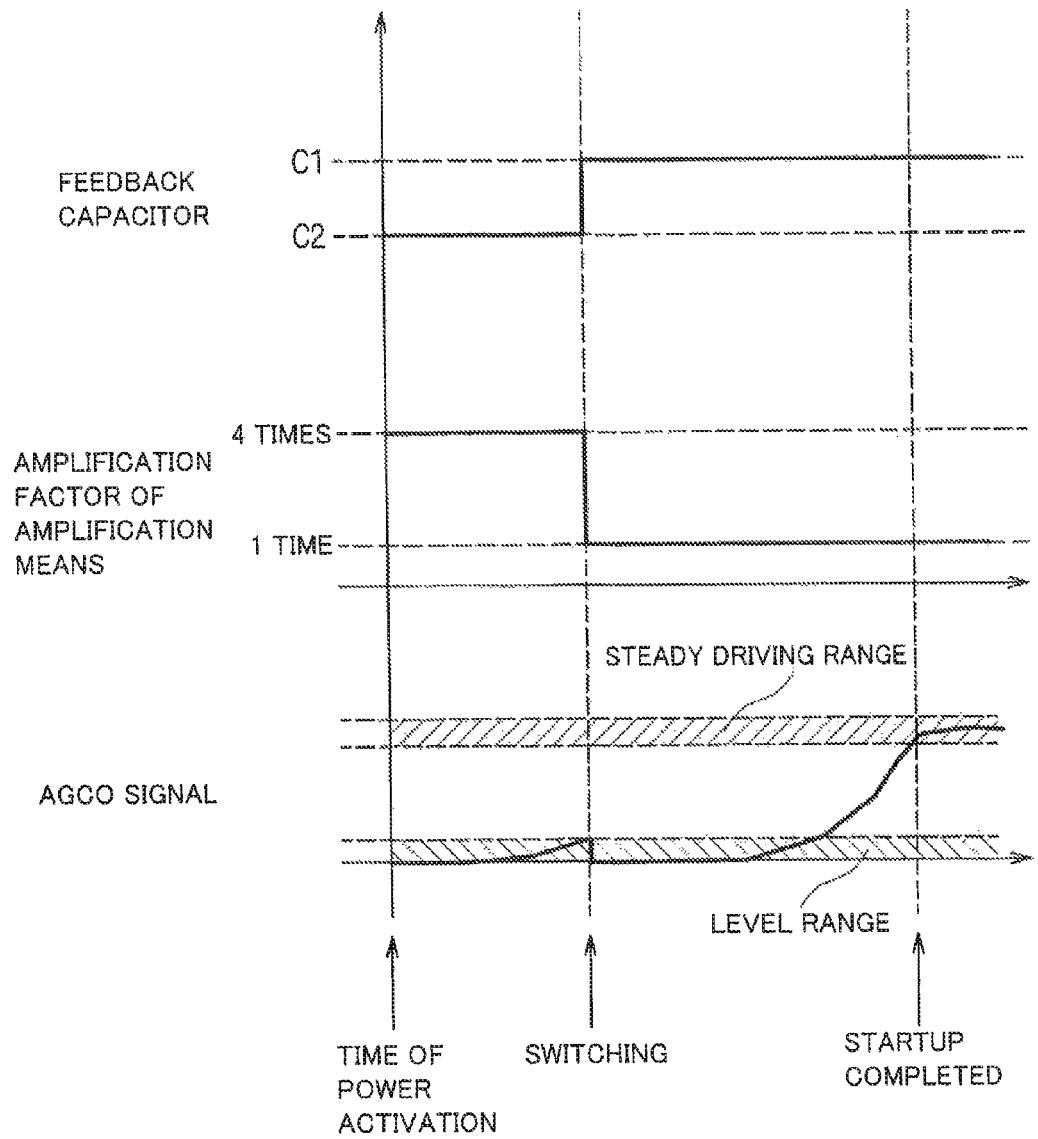
FIG. 4 represents an example of a timing chart of the switching and amplification factor of a CV conversion circuit, and an AGCO signal of an oscillation type inertia force sensor according to a preferred embodiment of the present invention.

FIG. 4 represents an example of a timing chart of the switching between feedback capacitors C1 and C2 of CV conversion circuit 21, the amplification factor of amplifier 21a, and the AGCO signal. As shown in FIG. 4, when power is turned on, CV conversion circuit 21 is connected with feedback capacitor C2 via switch 212, so that the amplification factor of amplifier 21a becomes approximately four times that when connected with feedback capacitor C1. Since FIG. 4 corresponds to the case where the amplification factor of VGA circuit 243 has a negative property to the control signal, the voltage level of the AGCO signal at the time of power activation is present in the level range where the gain based on the AGCO signal becomes less than or equal to the maximum gain of the amplification factor of VGA circuit 243.

After the power is turned on, the monitor signal amplified at CV conversion circuit 21 and VGA circuit 243 is supplied to driving element 12 of oscillator 1 as a driving signal. The driving element 12 drives oscillator 1 based on the supplied driving signal, and a monitor signal according to the oscillating state of oscillator 1 from monitor 13 is fed back to CV conversion circuit 21 and VGA circuit 243. By repeatedly feeding back the monitor signal, the drive of oscillator 1 approaches a steady state. The voltage level of the AGCO signal will fall outside the level range where the gain based on the AGCO signal becomes less than or equal to the maximum gain of the amplification factor of VGA circuit 243. At the point in time when the voltage level of the AGCO signal falls out the level range where the gain based on the AGCO signal becomes less than or equal to the maximum gain of the amplification factor of VGA circuit 243, CV conversion circuit 21 has the connection switched from feedback capacitor C2 to feedback capacitor C1 via switch 212. Accordingly, reduction in the gain of AGC circuit 24 can be prevented. In other words, the AGCO signal at the time of activation can be set high in a range where the amplification factor of VGA circuit 243 is not reduced, allowing the gain of oscillation circuit unit 2 to be increased totally.

When the connection is switched from feedback capacitor C2 to feedback capacitor C1 at CV conversion circuit 21, the amplification factor of amplifier 21*a* becomes approximately ¼ that when connected to feedback capacitor C2. By switching the connection from feedback capacitor C2 to feedback capacitor C1, the monitor signal fed back to CV conversion circuit 21 and VGA circuit 243 is altered greatly. The voltage level of the AGCO signal remains in the level range where the gain based on the AGCO signal becomes less than or equal to the maximum gain of the amplification factor of VGA circuit 243.

By repeating the feedback of a monitor signal subsequent to switching the connection from feedback capacitor C2 to feedback capacitor C1, the driving of oscillator 1 approaches a steady state. The voltage level of the AGCO signal arrives at a steady driving range from the level range where the gain based on the AGCO signal becomes less than or equal to the maximum gain of the amplification factor of VGA circuit 243. At the point in time when the voltage level of the AGCO signal arrives at a steady driving state, startup is completed, allowing the oscillation type inertia force sensor to detect the angular velocity of oscillator 1. The startup time in FIG. 4 refers to the period of time starting from power activation up to completion of power activation.

As set forth above, an oscillation type inertia force sensor according to a preferred embodiment of the present invention includes an oscillator 1, an oscillation circuit unit 2, and a detection circuit unit 3, wherein oscillation circuit unit 2 functions as a self oscillation circuit of a closed loop with oscillator 1 as a resonant element. Oscillation circuit unit 2 includes a CV conversion circuit 21 that converts a monitor signal based on an electrostatic capacitance according to the oscillating state of oscillator 1 into a monitor signal based on a voltage corresponding to the amount of change of the electrostatic capacitance, and an AGC circuit 24 that controls the amplification factor (gain) such that the amplitude of the monitor signal converted at CV conversion circuit 21 is constant to generate a driving signal, and supply the driving signal to oscillator 1. Since CV conversion circuit 21 includes amplifier 21*a* that amplifies the monitor signal with a predetermined amplification factor for a predetermined period after power activation, a greatly amplified monitor signal is supplied to driving element 12 of oscillator 1 as a driving signal to greatly alter the oscillating state of oscillator 1, allowing the period of time starting from power activation and until the angular velocity of oscillator 1 can be detected, i.e. the startup time, to be significantly shortened. Furthermore, since the startup time of the oscillation type inertia force sensor is shortened by using amplifier 21*a* of CV conversion circuit 21, AGC circuit 24 can be used in the gain variable range of VGA circuit 243. An AGC circuit stable in operation and favorable in accuracy can be realized.

At an oscillation type inertia force sensor according to a preferred embodiment of the present invention, CV conversion circuit 21 is connected with feedback capacitor C2 to have the amplification factor of amplifier 21*a* increased during a period where the voltage level of the AGCO signal is located in the level range where the gain based on an AGCO signal becomes less than or equal to the maximum gain of the amplification factor of VGA circuit 243, where the amplification factor of VGA circuit 243 (the gain of AGC circuit 24) does not change even if the AGCO signal changes after the power is turned on. At an oscillation type inertia force sensor according to a preferred embodiment of the present invention, by switching the connection from feedback capacitor C2 to feedback capacitor C1 via switch 212 at the point in time when the voltage level of the AGCO signal falls outside the level range where the gain based on the AGCO signal becomes less than or equal to the maximum gain of the amplification factor of VGA circuit 243, reduction in the amplification factor of VGA circuit 243 can be prevented. The period of time starting from power activation and until the angular velocity can be detected, i.e. the startup time, can be reduced.

At the oscillation type inertia force sensor according to a preferred embodiment of the present invention, CV conversion circuit 21 has the connection switched from feedback capacitor C2 to feedback capacitor C1 via switch 212 at the point in time when the voltage level of the AGCO signal falls outside the level range where the gain based on the AGCO signal becomes less than or equal to the maximum gain of the amplification factor of VGA circuit 243. In other words, CV conversion circuit 21 has the connection switched from feedback capacitor C2 to feedback capacitor C1 based on the AGCO signal. By CV conversion circuit 21 having the connection switched from feedback capacitor C2 to feedback capacitor C1 at the point in time when the voltage level of the AGCO signal falls outside the level range where the gain based on the AGCO signal becomes less than or equal to the maximum gain of the amplification factor of VGA circuit 243, the AGCO signal at the time of startup can be set high in a range where the amplification factor of VGA circuit 243 is not reduced. Since the gain of oscillation circuit unit 2 totally can also be increased, the period of time starting from power activation and until the angular velocity of oscillator 1 can be detected, i.e. the startup time, can be shortened. Since the amplification factor of VGA circuit 243 has a negative property to the control signal in FIG. 4, the case where the voltage level of the AGCO signal is located in a level range where the gain based on the AGCO signal becomes less than or equal to the maximum gain of the amplification factor of VGA circuit 243 at the time of power activation has been described. However, in the case where the amplification factor of VGA circuit 243 has a positive property to the control signal, the voltage level of the AGCO signal is located in the level range where the gain based on the AGCO signal becomes greater than or equal to the maximum gain of the amplification factor of VGA circuit 243 at the time of power activation.

Figure 5:
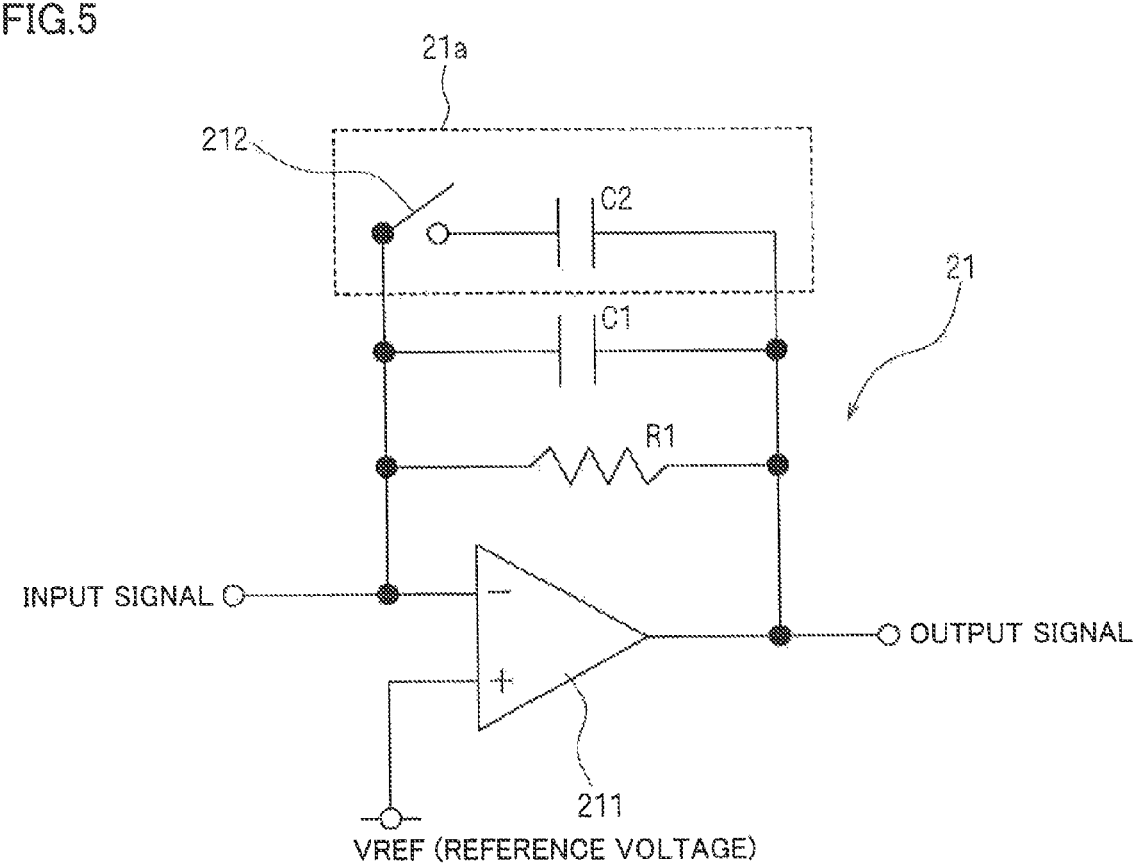
FIG. 5 is a circuit diagram representing another configuration of a CV conversion circuit of an oscillation type inertia force sensor according to a preferred embodiment of the present invention.

FIG. 5 is a circuit diagram representing another configuration of CV conversion circuit 21 of an oscillation type inertia force sensor according to a preferred embodiment of the present invention. CV conversion circuit 21 of FIG. 5 preferably includes a feedback capacitor C1 constantly connected to operational amplifier 211, a feedback capacitor C2 connected parallel to feedback capacitor C1, and as amplifier 21*a* that amplifies a monitor signal, a switch 212 that switches the connection/disconnection between feedback capacitor C2 and operational amplifier 211 to switch the level of the feedback capacitor. Therefore, CV conversion circuit 21 of FIG. 5 has a configuration in which feedback capacitor C1 is constantly connected with operational amplifier 211 even if switch 212 is in error and the connection between feedback capacitor C2 and operational amplifier 211 is disabled. Therefore a CV conversion circuit 21 having a fail safe configuration, avoiding fatal failure, can be realized. Feedback capacitor C2 is not limited to a configuration in which one capacitor is connected parallel to feedback capacitor C1, and a configuration in which a plurality of capacitors are connected parallel to feedback capacitor C1 may be used.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An oscillation type inertia force sensor comprising:
an oscillator that is used to detect inertia force;
an oscillation circuit unit that supplies a driving signal to the oscillator; and
a detection circuit unit that detects inertia force of the oscillator; wherein
the oscillation circuit unit is a self oscillation circuit of a closed loop with the oscillator defining a resonant element, and the oscillation circuit unit includes:
a signal conversion circuit that converts a monitor signal based on electrostatic capacitance according to an oscillating state of the oscillator into a monitor signal based on a voltage corresponding to an amount of change of the electrostatic capacitance; and
an automatic gain control circuit that amplifies the monitor signal converted at the signal conversion circuit with a gain controlled by a control signal to generate the driving signal, and that supplies the driving signal to the oscillator; wherein
the automatic gain control circuit generates the control signal so that an amplitude of the monitor signal converted at the signal conversion circuit is constant;
the signal conversion circuit includes:
an operational amplifier that receives the monitor signal based on electrostatic capacitance and outputs the converted monitor signal to the automatic gain control circuit;
a first feedback capacitor;
a second feedback capacitor connected in parallel to the first feedback capacitor; and
a switch that switches connection and disconnection between each of the first and second feedback capacitors and the operational amplifier; and
the signal conversion circuit is configured to:
connect the operational amplifier to the first feedback capacitor and disconnect the operational amplifier from the second feedback capacitor via the switch for a period determined based on a change of the control signal from power activation;
connect the operational amplifier to at least the second feedback capacitor via the switch after the elapse of the determined period; and
output, for the determined period, the converted monitor signal which is amplified with an amplification factor greater than that after the elapse of the determined period.

2. The oscillation type inertia force sensor according to claim 1, wherein, when an amplification factor of an amplification circuit in the automatic gain control circuit has a negative property to the control signal, the determined period is a period during which the gain based on the control signal becomes less than or equal to a maximum gain of the amplification factor of the amplification circuit in a range where the gain varies corresponding to a change of the control signal after power activation.

3. The oscillation type inertia force sensor according to claim 1, wherein, when an amplification factor of an amplification circuit in the automatic gain control circuit has a positive property to the control signal, the determined period is a period during which the gain based on the control signal becomes greater than or equal to a maximum gain of the amplification factor of the amplification circuit in a range where the gain varies corresponding to a change of the control signal after power activation.

4. The oscillation type inertia force sensor according to claim 1, wherein
the first feedback capacitor is constantly connected to the operational amplifier.

5. The oscillation type inertia force sensor according to claim 1, wherein the signal conversion circuit is configured to connect the operational amplifier to the second feedback capacitor and disconnect the operational amplifier from the first feedback capacitor via the switch after the elapse of the determined period, and the first feedback capacitor has a capacitance smaller than that of the second feedback capacitor.

* * * * *